United States Patent Office

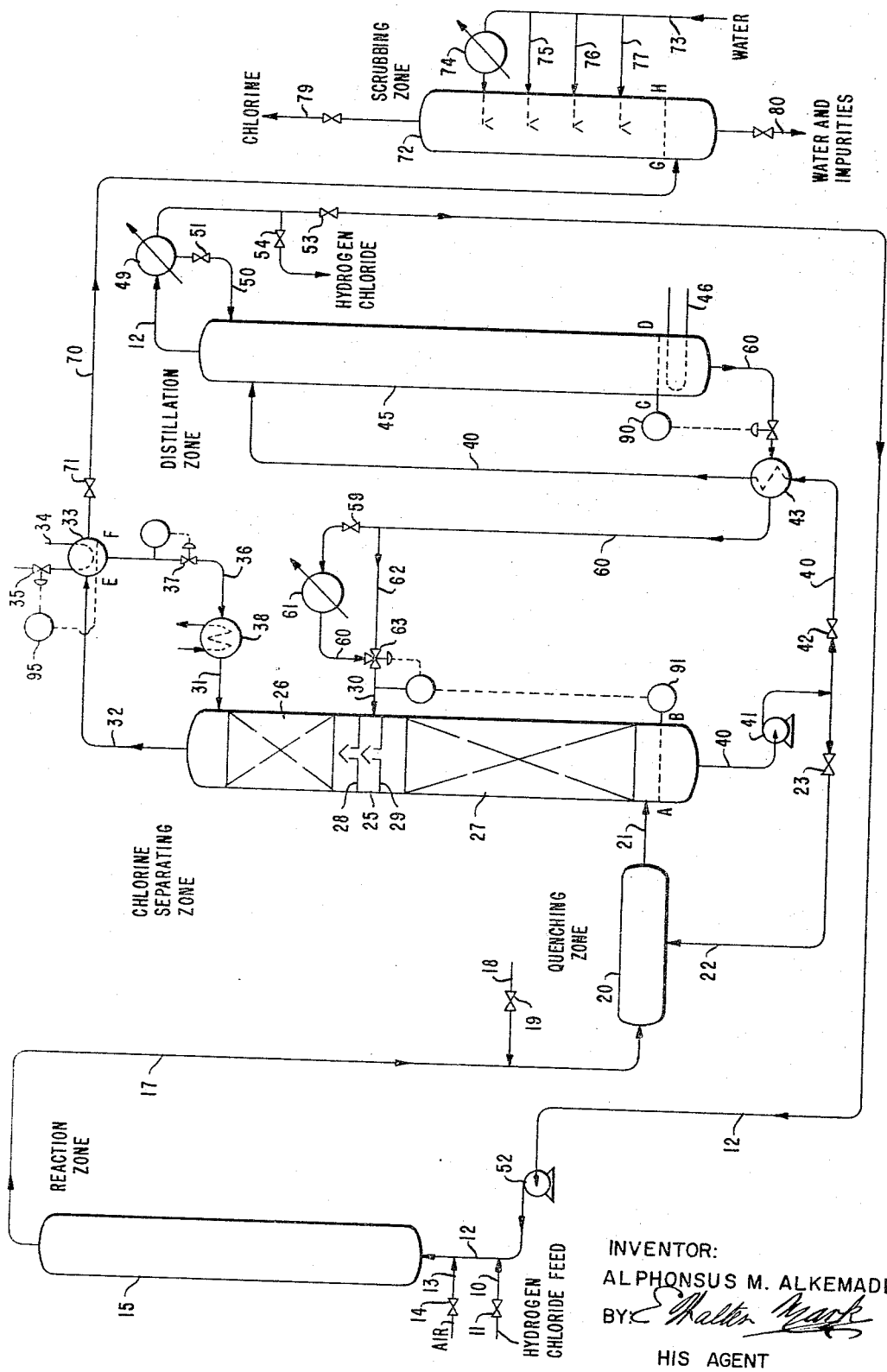

3,315,440
Patented Apr. 25, 1967

3,315,440
HYDROGEN CHLORIDE RECOVERY FROM ADMIXTURE WITH CHLORINE USING WATER EXTRACTANT
Alphonsus M. Alkemade, The Hague, Netherlands, assignor to Shell Oil Company, New York, N.Y., a Delaware corporation
Filed Dec. 2, 1963, Ser. No. 327,205
Claims priority, application Netherlands, Dec. 5, 1962, 286,349
The portion of the term of the patent subsequent to Feb. 8, 1983, is disclaimed
3 Claims. (Cl. 55—48)

This invention relates to an improvement in the recovery of hydrogen chloride free of any substantial amount of water from gaseous reaction products obtained at elevated temperatures containing hydrogen chloride in admixture with water vapor and normally gaseous materials comprising chlorine. The invention relates more particularly to the recovery of substantially anyhdrous hydrogen chlorine, in a high state of purity, from the hot reaction mixtures comprising water and chlorine produced by reaction of hydrogen chloride with oxygen in the presence of a solid catalyst at elevated temperatures.

The process of the invention is applied broadly to the recovery of hydrogen chloride free of any substantial amount of water, and in a high state of purity from gaseous mixtures containing hydrogen chloride in admixture with normally gaseous materials including chlorine and water vapor obtained at elevated temperatures.

The invention is applied with particular advantage to the recovery of hydrogen chloride, free of any substantial amount of water, from the impure, hot, gaseous reaction mixtures obtained in the production of chlorine by the reaction of hydrogen chloride with oxygen, or an oxygen-containing gas, in the presence of a suitable solid catalyst, for example, a metal compound-containing catalyst such as a copper chloride-containing catalyst. This reaction is known to proceed in the general temperature range of, for example, from about 300° to about 600° C. resulting in a gaseous reactor effluence the temperature of which is in this range. However, until recently the execution of this reaction at temperatures of approximately 400° C. and lower was often only a theoretical possibility. The catalysts used generally did not enable the reaction to proceed at these temperatures at a rate commensurate with practical scale operation. At the high temperatures, of necessity employed in these processes, equilibrium for the reaction is attained only at relatively low conversions and conversions of only 30 to 40% were often not surpassed. The need to rely upon such relatively inefficient methods of operation has been obviated by the method disclosed and claimed in copending U.S. application Ser. No. 83,134, filed Jan. 17, 1961, now U.S. Pat. No. 3,210,158, for the oxidative catalytic conversion of hydrogen chloride to chlorine with the aid of a catalyst enabling the execution of the reaction to proceed not only at substantially lower temperatures, but with attainment in practical scale operation of conversions corresponding substantially to the theoretical equilibrium value for the reaction. As is known, the theoretical equilibrium values become progressively more favorable with decreasing temperatures. Conversions of the order of about 75% are readily achieved in the process described and claimed in said copending application. Since the reaction involved in the oxidative conversion of hydrogen chloride to chlorine is an equilibrium reaction the hot reactor effluence will always comprise, even at the high conversion levels, some unconverted hydrogen chloride in addition to chlorine and water vapor. If the reactants charged are not pure, additional components are present in the reaction mixture. When using air as the oxygen source the hot reactor effluence will additionally comprise nitrogen.

In separating chlorine from such hot gas mixtures obtained by the catalytic oxidation of hydrogen chloride, the first step generally is to reduce its temperature, for example, to about 40° C.–150° C. This may be done by quenching with water and/or hydrochloric acid. After quenching the gas mixture may be further worked up by various procedures; for instance by washing with water and/or dilute hydrochloric acid (in which case a large portion of any water vapor present will also condense), or by cooling the gas mixture to such an extent that at least a part of the water vapor present therein condenses and the hydrogen chloride gas is dissolved therein. The residual chlorine-containing gas can then be dried. Finally chlorine may be separated from the gas mixture, for example, by liquifaction at elevated pressure, solvent extraction using a suitable solvent, such as carbon tetrachloride. Recourse to such methods of product resolution generally results in the obtaining of the hydrogen chloride component as aqueous hydrochloric acid. It is, however, often desirable, and at times essential to practical operation, that the hydrogen chloride be returned to the reaction for further conversion to the desired chlorine. Efficient operation precludes the introduction of any substantial amounts of aqueous hydrogen chloride (hydrochloric acid) into the reaction zone. The recycling of the hydrogen chloride can therefore generally not be resorted to in operations wherein this component is recovered as aqueous hydrogen chloride (hydrochloric acid) without adversely effecting the efficiency of the process. To convert such aqueous hydrogen chloride product in a separate operation to substantially anhydrous hydrogen chloride suitable for recycling not only presents difficult technical problems but increases inordinately the cost of the overall operation.

A process enabling the efficient recovery of hydrogen chloride in substantially anhydrous form suitable for recycling, and chlorine, with a minimum of operative steps, from the hot reaction mixtures obtained in the catalytic oxidative conversion of hydrogen chloride to chlorine is therefore of exceeding importance to the industry.

It is therefore an object of the present invention to provide an improved process enabling the more efficient recovery of hydrogen chloride free of any substantial amount of water from hot gaseous reaction mixtures comprising hydrogen chloride in admixture with water vapor and normally gaseous materials comprising chlorine.

Another object of the invention is the provision of an improved process enabling the more efficient recovery of substantially anhydrous hydrogen chloride from the hot gaseous mixtures containing hydrogen chloride in admixture with chlorine, water vapor and fixed gas produced by catalytic oxidative conversion of hydrogen chloride.

Still another object of the present invention is the provision of an improved process enabling the more efficient production of chlorine by catalytic oxidative conversion of hydrogen chloride providing for the inherent recovery and recycling to the reaction zone of unconverted hydrogen chloride in substantially anhydrous form. Other objects and advantages of the present invention will become apparent from the following detailed description thereof made with reference to the attached drawing wherein the single figure represents a diagrammatic elevational view of one form of apparatus suitable for carrying out the process of the invention.

The process of the invention provides a method enabling not only substantially complete recovery of both the chlorine and hydrogen chloride components of the hot reaction mixture charged, but provides for inherent separation between hydrogen chloride and water with a minimum of operative steps, thereby making possible the efficient recovery of the hydrogen chloride in substantially anhydrous form.

In accordance with the invention chlorine and hydrogen chloride free of any substantial amount of water are separately recovered from a hot gaseous reaction mixture containing hydrogen chloride in admixture with water vapor and chlorine by the combination of steps consisting essentially of: quenching the hot gaseous mixture in a quenching zone to a temperature of from about 40 to about 150° C. with hydrochloric acid emanating thereto from within the system, subjecting the resulting quenched mixture to countercurrent contact in an extraction zone with liquid solvent emanating thereto as two separate streams from within the system as described below, thereby separating a vapor overhead fraction comprising water vapor and chlorine from a liquid bottom fraction comprising concentrated hydrochloric acid in said extraction zone, passing said overhead vapor fraction from said extraction zone into a cooling zone, cooling said overhead vapor fraction in said cooling zone, thereby separating a liquid fraction consisting essentially of water from a gaseous fraction comprising chlorine and water vapor in said cooling zone, separating chlorine from said gaseous fraction separated in said cooling zone, passing said liquid fraction from said cooling zone into said extraction zone at a point near the withdrawal of said vapor overhead fraction therefrom to be used therein as one of said two streams of solvent emanating thereto from within the system, passing a part of said liquid bottom fraction separated in said extraction zone into said quenching zone to be used therein as said hydrochloric acid emanating thereto from within the system, passing the remainder of said liquid bottom fraction separated in said extraction zone into a distillation zone, distilling hydrogen chloride free of any substantial amount of water from liquid bottoms consisting essentially of dilute hydrochloric acid approximating the composition of hydrogen chloride water azeotrope in said distillation zone, passing liquid bottoms from said distillation zone into said extraction zone at an intermediate point thereof to be used therein as the other of said two solvent streams emanating thereto from within the system, and controlling the degree of cooling and consequent water vapor condensation effected in said cooling zone to maintain the quantity of water retained in said gaseous fraction separated in said cooling zone plus any quantity of water eliminated with the uncondensed overhead from said distillation zone substantially equal to the quantity of water in said hot gaseous mixture introduced into said quenching zone.

When the recovery process of the invention is integrated with the reaction system producing the hot gaseous mixture processed, for example, by the catalytic oxidative conversion of hydrogen chloride to chlorine, the overhead from the distillation zone of the recovery system, consisting essentially of hydrogen chloride free of any substantial amount of water, is recycled directly to the reaction zone. The integrated recycle process of the invention thus enables the substantially complete conversion of the hydrogen chloride charge to the catalytic oxidative conversion to chlorine with substantially improved efficiency.

Referring to the figure in the attached drawing: Hydrogen chloride, emanating from an outside source through line 10, provided with valve 11, is forced into line 12 wherein it mixes with hydrogen chloride recycled from within the system as described below. An oxygen-containing gas, for example, air is introduced into line 12 from an outside source through line 13, provided with valve 14. The resulting admixture of air and hydrogen chloride passes from line 12 into a reaction zone, comprising, for example, a suitable reactor 15 wherein the mixture is subjected to oxidative conversion conditions to effect the oxidative conversion of hydrogen chloride to chlorine. Suitable oxidative reaction conditions comprise those described and claimed in copending U.S. application Ser. No. 83,134 above referred to including, for example the presence of a catalyst consisting essentially of a mixture of copper chloride-potassium chloride-didymium chloride and a suitable solid support, such as finely divided silica, and a temperature in the range of about 300–400° C. Although the use of such reaction conditions are preferred as the source of the hydrogen chloride-containing gaseous mixture treated in accordance with the invention, it is to be understood that the invention is not necessarily limited with respect to the specific reaction conditions employed in the production of the gaseous mixture subjected to the process of the invention, and any conditions producing the suitable gaseous hydrogen chloride containing charge may suitably be employed in reactor 15.

Reactor effluence, for example, at a temperature of from about 250 to about 400° C. comprising unconverted hydrogen chloride in admixture with water vapor, chlorine, fixed gases including oxygen, nitrogen, oxides of carbon, as well as any organic impurities, is passed from reactor 15 through line 17 into a suitable quenching zone. The quenching zone may comprise a zone of enlarged cross-sectional area such as, for example, a chamber 20. A suitable quenching zone may comprise instead, or in addition, an enlarged pipe, coil or the like, suitable for assuring intimate contact of the quenching medium with the hot reactor effluence. These may furthermore be provided with suitable baffles, venturi injectors, and the like.

A line 18, provided with valve 19, discharging into line 17, is provided for the introduction of suitable hot hydrogen chloride-containing gas, of the type described herein as suitable for treatment in accordance with the invention, into the system from any suitable outside source. Such gaseous mixture introduced through valved line 18, may constitute a part or all of the gaseous mixture charged through line 17 into chamber 20.

Within chamber 20 the hot gas mixture is quenched with a suitable quenching medium such as, for example, hydrochloric acid emanating from within the system through line 22 provided with valve 23. There is a large degree of freedom in the temperature to which the hot gas mixture passing through line 17 is cooled in quenching chamber 20. Quenching is controlled by the quantity of quenching liquid supplied through line 22. If cooling is carried out in chamber 20 to below the dew-point of the resultant gas mixture, a mixture of gas and liquid will result. In general, quenching the hot gases to a temperature in the range of from about 40° to about 150° C. is satisfactory. From chamber 20, the quenched mixture is passed through line 21 into a suitable chlorine separating zone. The suitable chlorine separating zone may comprise, for example, an extraction column 25. Within column 25 the quenched mixture charged thereto through line 21 passes upward countercurrent to liquid solvent. In the lower part of column 25 the quenched mixture is brought into direct countercurrent contact with a stream of liquid solvent comprising an admixture of (a) dilute hydrochloric acid, for example, having the approximate composition of the hydrogen chloride-water azeotrope emanating from within the system, and introduced into column 25 at an intermediate point thereof, by means of line 30 and (b) a rich liquid absorbate, consisting essentially of dilute hydrochloric acid, flowing down from the upper part of the column 25. A substantial part of the hydrogen chloride content of the quenched mixture will be absorbed by the solvent stream in the lower part of column 25 with the separation of a rich liquid absorbate consisting, for example, of more concentrated hydrochloric acid, in the bottom of column 25. This hydrochloric acid may consist, for example, of hydrochloric acid of about 23.5% by weight concentration. Within the upper part of column 25 the upward flowing gaseous mixture is brought into direct countercurrent contact with a liquid stream of water emanating from within the system and introduced into the top of column 25 by means of line 31. In the upper part of the column 25 the liquid water scrubs out substantially all of the remaining hydrogen chloride to form a dilute hydrochloric acid which passes downwardly into the lower part of column 25 as supplementary solvent. The gaseous mixture leaving the upper part of column 25 comprising water vapor, chlorine, fixed gases comprising nitrogen and oxides of carbon, now substantially free of hydrogen chloride, is passed from the top of column 25, through line 32, into a suitable cooling zone, comprising for example, cooler 33 provided with closed cooling coil 34 provided with valve 35.

Within cooler 33 the gaseous mixture charged thereto is subjected to cooling to effect the condensation of a controlled amount of the water vapor content of the charge thereto. The resulting aqueous fraction separated in condenser 33 is passed therefrom through line 36, provided with valve 37, into a heating zone, for example, an indirect heat exchanger 38, and thence through line 31 into the upper part of column 25, to be used therein as the water solvent emanating from within the system referred to above.

The gaseous fraction separated in the condenser 33, comprising chlorine, water vapor, fixed gas including nitrogen, and oxides of carbon, is eliminated therefrom through line 70 provided with valve 71 and sent to suitable chlorine separating and optionally purifying means.

The liquid absorbate bottom fraction consisting essentially of the more concentrated hydrochloric acid is taken from the bottom of column 25 and forced through line 40 provided with valve 42, by means of pump 41, into a suitable distillation zone, comprising, for example, distillation column 45 and condenser 49.

A part of the stream of hydrochloric acid flowing through line 40 is diverted through line 22, provided with valve 23, into quench chamber 20 to be used therein as the quenching medium emanating from within the system referred to above.

Within distillation column 45 hydrogen chloride is distilled from the relatively concentrated hydrochloric acid charged thereto through line 40 leaving as liquid distillation bottoms in still 45 a dilute hydrochloric acid having the approximate composition of the hydrogen chloride-water azeotrope. A closed heating coil 46 in the lower part of still 45, and an indirect heat exchanger 43 positioned in line 40, provide the necessary heat for the distillation.

Distillation bottoms are withdrawn from the bottom of distillation column 45 and passed through line 60, provided with valve 59, through exchanger 43, and through cooler 61, into line 30 discharging into an intermediate part of column 25 to provide the dilute hydrochloric acid emanating thereto from within the system and used therein as the solvent referred to above. A by-pass line 62 leading from line 60 into line 30 is provided to enable the by-passing of cooler 61. A three-way control valve 63 is provided to control the relative flow from lines 60 and 62 into line 30.

The overhead from distillation column consisting of hydrogen chloride and water vapor is passed therefrom through line 12 into condenser 49 wherein the stream is cooled to condense substantially all of the water content thereof. The water so condensed is returned via line 50 provided with valve 51 to the upper part of still 45 as reflux. The hydrogen chloride, free of any substantial amount of water, is forced through line 12 by means of pump 52 to the reactor 15. The hydrogen chloride gases leaving condenser 49 through line 12 may still contain a small quantity of water vapor. This gas may be safely returned to the oxidation reactor, because the quantity of water vapor is so slight that the oxidation reaction is hardly influenced by it. If desired, however, the quantity of water vapor in the gas leaving condenser 49 may be reduced by cooling to a lower temperature in the condenser 33.

The conditions within still 45 may vary widely but in general distillation under elevated pressure is advantageous, because at higher pressures the azeotropic composition of hydrochloric acid shifts to smaller HCl concentrations. Moreover, in this case the hydrogen chloride gas becomes available under super-atmospheric pressure which is desirable when it is intended to return this gas to the oxidation reactor.

It has been stated above the hydrochloric acid of substantially azeotropic composition collects in the bottom part of the still 45 and is withdrawn therefrom through the line 60. The HCl concentration of the acid is generally a little higher than the azeotropic concentration. In theory it would be necessary to operate in a distillation column with an infinite number of theoretical trays in order to obtain acid of the exact azeotropic composition. In practice it would be possible to approximate to the azeotropic composition as closely as desired by using a column with a sufficient number of theoretical trays. However, practice also sets limits to the cost and the effort which may reasonably be devoted to the distillation. This means that in practice the production of an acid the composition of which slightly deviates from the azeotropic composition has to be accepted. The expressions "hydrochloric acid of azeotropic composition" and "hydrochloric acid azeotrope" as used in the specification and the claims, should be understood in this sense. Thus, the distillation bottoms in still 45 may consist of hydrochloric acid of about 18% by weight concentration.

It will be apparent that column 25 may be viewed as comprising two consecutive extraction zones, lower section 27 and upper section 26, arranged in series flow and separated by bubble plates 28 and 29. The rich liquid aqueous absorbate leaving section 26 at the bottom thereof admixes with the dilute acid solvent entering in line 30 and the resulting liquid admixture continues into and downward through the lower section 27. Comprised within the scope of the invention is the use of two separate extraction columns arranged in series flow to replace sections 26 and 27 of column 25.

The extraction sections 26 and 27 of column 25 may optionally be packed with suitable packing material such as, for example, Raschig rings or the like. Column 25 may be constructed of material which is resistant to the materials coming into contact therewith. A steel column lined with acid-resisting ceramic material, with an intermediate rubber layer is satisfactory.

Essential to the attainment of the objects of the invention is the maintaining of conditions such that the total quantity of water leaving the cooler 33 through line 70 and condenser 49 through lines 12 is equal to the quantity of water introduced into chamber 20 through line 17. As indicated above the quantity of water leaving condenser 49 will generally be small. These limiting conditions are attained in the system represented in the figure of the attached drawing. Thus, equivalence of the quantity of water, supplied through line 17 to the total quantity drawn off from cooler 33 and condenser 49 through lines 70 and 12, respectively, means that the total quantity of water present in the system remains substantially constant; inequality of these quantities results in an increase or decrease of the total quantity of water present in the system. There are three important liquid levels in the system, viz. AB in column 25, CD in still 45 and EF in the cooler 33. Any substantial variation in the total quantity of water present in the system is reflected by a rise or drop in these liquid levels. By keeping these levels relatively constant, the total quantity of water present in the system is kept substantially constant.

Liquid level CD may be kept constant by means of a level controller 90, operating a valve in line 60.

Level AB is controlled by level controller 91, which operates a temperature controller connected to the line 30, which in turn operates the control valve 63. If level AB rises, the control valve 63 is adjusted by the control equipment and a larger portion of the hydrochloric acid supplied through the line 60 passes through line 62 and a lesser portion through cooler 61, so that the hydrochloric acid introduced into column 25 through line 30 is brought to a higher temperature. Since in this way more heat is supplied to column 25, the temperature at the top of the column rises and consequently the saturated water vapor pressure above the liquid rises, as a result of which more water vapor will pass through line 32, so that level AB will drop again. Likewise a drop in level AB is counteracted by control valve 63 in such a way that of the hydrochloric acid supplied through line 60, a smaller portion passes through the line 62 and a larger portion passes through cooler 61.

This method of control ensures that the quantity and the temperature of the water supplied through line 31 are kept constant. The temperature is kept constant by means of heat exchanger 38. The quantity is kept constant by means of a flow-controller connected to line 36 which operates valve 37. Fluctuations in the total supply to column 25 are primarily caused by fluctuations in the composition of the gas mixture supplied through the line 17. By means of the control method described, the system adapts itself to these fluctuations.

The described control of the temperature of the hydrochloric acid introduced into column 25 through line 30 is sufficient to keep level AB constant. The column automatically finds a stage of equilibrium and a new state of equilibrium is automatically reached when the circumstances change. The temperature in column 25 is affected by three important heat effects. The first is the liberation of heat in the absorption in water of the hydrogen chloride gas supplied through the line 17. The second is the liberation of heat owing to the condensation of water and absorption of hydrogen chloride gas, which have been introduced as liquid hydrochloric acid into chamber 20 through the line 22, have been evaporated therein, and enter column 25 in vapor form through line 21. The third is the consumption of heat for the evaporation of water supplied through line 31 which water again leaves as vapor from column 25 through line 32. If for one reason or another, the oxidation reaction is proceeding less satisfactorily, then the gas mixture passing through line 17 will contain an increased amount of hydrogen chloride and less water. More HCl must therefore be absorbed in column 25, so that more heat is liberated and the temperature tends to rise. When the temperature at the top of column 25 is increased, the gas mixture passing through line 32 will contain more water vapor. Level AB will then drop. In the manner described above, the temperature of the hydrochloric acid introduced through line 30 will be reduced by means of the control equipment. As a result the temperature in column 25 tends to drop, which counteracts the above-mentioned tendency to rise. The result is that a state of equilibrium is quickly attained again.

Liquid level EF is also kept constant. The quantity of water which is drawn from cooler 33 through line 36 is kept substantially constant. In order to keep the level EF constant it is sufficient, when the quantity of water vapor introduced into cooler 33 through the line 32 increases or decreases, to increase or decrease in the same degree the quantity of water vapor drawn off from cooler 33 through line 70. This is done by controlling the degree of cooling in cooler 38. To this end the level EF may be controlled by a level controller 95, operating valve 35 in coil 34.

It is seen that there is a large measure of freedom in the choice of the temperature and the quantity of water supplied through line 31 and of the cooling temperature in exchanger 61. In a preferred method of control, however, these magnitudes are chosen as follows: The temperature of the water supplied through line 31 is preferably so chosen, that it is approximately equal to the temperature in the top of column 25 in normal operation. The quantity of this water is preferably so chosen that owing to the evaporation heat of this water the column 25 operates approximately adiabatically. In this case it is not necessary to use the temperature of the hydrochloric acid supplied through line 30 in order to keep column 25 in heat balance, so that this acid may enter the column at approximately the same temperature as the temperature prevailing in situ in the column. Since this acid is supplied through line 60 and control of the temperature of the acid in the line 30 is easiest when, in normal operation, approximately the same quantity of acid flows through line 62 and cooler 61 the cooling temperature in cooler 61 is set at a fixed value, for example, about 80° C. After the temperature and the quantity of the water supplied through line 31 and the cooling temperature in cooler 61 have once been chosen, the temperature of the acid in line 30 may be readily used to counteract any fluctuation in composition of gas mixture supplied through line 17, as described above.

In practice this is readily realized because, with a given composition of the gas mixture supplied through the line 17, the heat-effects in column 25 may be calculated. On this basis, the cooling temperature in cooler 61 and the temperature in exchanger 38 are set and approximately the correct water stream through line 31 is then chosen. If it then appears that with the chosen water flow rate through line 31, very unequal flow rates of hydrochloric acid through line 62 and cooler 61 are necessary, the flow rate through line 31 is adjusted, so that the column operates with approximately equal streams of hydrochloric acid through cooler 61 and line 62. In further operation the flow through line 36 is then left constant.

Comprised within the peak of the invention is the method of operation with the introduction of water from an outside source into quenching chamber 20. Such water is then included in the sum total of water withdrawn from the system through line 70 and condenser 49.

The gaseous fraction comprising chlorine, fixed gas and water vapor leaving cooler 33 through line 70 is sent to suitable chlorine recovery means. The greater part of its water vapor may be removed by cooling. This may be carried out quite readily under conditions effecting the simultaneous removal of any organic impurity such as, for example, $C_2Cl_6$. To this end the contents of line 70 are discharged into a scrubbing zone, comprising, for example, a tower 72, wherein the gaseous stream passes upward countercurrent to a spray of water introduced through lines 73, 75, 76 and 77. The water is cooled to a low temperature, for example, below about 15° C. with the aid of cooler 74 and other means not shown in the drawing. As a result of such cooling both water vapor and $C_2Cl_6$ condense from the gaseous stream. A liquid phase (level GH) collects in the lower part of tower 72. This liquid consisting essentially of water, and suspended crystallized $C_2Cl_6$, if the latter impurity was present, is drawn from tower 72 through valved line 80.

The scrubbed gas consisting essentially of chlorine and nitrogen is taken overhead from tower 72 through valved line 79.

*Example*

The numbers in parentheses given in the following example refer to the similarly numbered parts of the apparatus shown in the attached drawing and referred to in the above detailed description of the invention.

A gaseous stream of 5,241 kg./hr., obtained by the catalytic oxidative conversion of hydrogen chloride with air in a reactor (15) at 365° C. under the conditions described in U.S. application Ser. No. 83,134, filed Jan. 17, 1961, is found to have the following compositions in parts by weight:

| | |
|---|---:|
| HCl | 667 |
| $H_2O$ | 521 |
| $C_2Cl_6$ | 47 |
| $O_2$ | 110 |
| $N_2$ | 1,952 |
| $CO_2$ | 35 |
| $Cl_2$ | 1,900 |
| $CCl_4$ | 9 |
| | 5,241 |

The gaseous mixture is cooled from 365° to 95° C. by quenching with 600 kg./hr. of hydrochloric acid of a concentration of 23.5% by weight, that is 141 kg./hr. HCl+459 kg./hr $H_2O$, of 95° C., in a quenching chamber (20); the hydrochloric acid so added as quench emanates from within the system and is totally vaporized. The resulting gaseous mixture now contains 808 kg./hr. of HCl and 980 kg./hr. of $H_2O$; its composition is unaltered as regards the other components so that the total gas stream is now 5,841 kg./hr.; its temperature is 95° C. and the pressure 1.5 atm. abs. This gas mixture is introduced into the lower part of an extraction column (25) wherein it is contacted in succession first with a liquid stream of dilute hydrochloric acid (27) and thereafter with a stream of water (26) both streams emanating from within the system. 1,075 kg./hr. of water at 90° C. are introduced into the top (31) of the extraction column (25). Into an intermediate part (30) of the extraction column (25) there are introduced 9,255 kg./hr. of dilute hydrochloric acid, at 97° C., having a concentration of 18% by weight. A liquid fraction consisting of hydrochloric acid having a concentration of 23.5% by weight, and which is at a temperature of 95° C., accumulates as bottom liquid (AB) in the extraction column (25).

The liquid bottoms are drawn from the extraction column (25) at the rate of 10,527 kg./hr. (40). Of the liquid bottoms so withdrawn from the extraction column (25) 600 kg./hr. flow (22) to the quenching chamber (20) to be used therein as the quenching medium referred to above. The remainder of the liquid bottoms (25) 9,927 kg./hr. flow (40) through a preheater (43) wherein they are preheated to 135° C., into a still (45). The still (45) is operated at a bottom still temperature of 151° C. with a pressure of 4.0 atm. abs. in the lower part, and 3.9 atm. abs. in the upper part. Hydrogen chloride and water vapor are distilled overhead leaving as still bottoms hydrochloric acid of 18% by weight concentration (CD). The still bottoms are continuously withdrawn (60) at the rate of 9,255 kg./hr. and sent to the intermediate part (30) of the extraction column (25) to be used therein as the dilute acid referred to above. The still bottoms passing to the extraction columns are cooled by indirect exchange (43) with still charge to 110° C. Of the cooled (43) still bottoms a 4,010 kg./hr. portion is further cooled in a cooler (61) to 80° C. and thereafter recombined with the remaining 5,245 kg./hr. still bottoms stream. The recombined 9,255 kg./hr. stream of still bottoms (30) now at a temperature of 97° C. is then introduced into the extraction column (25) at an intermediate part thereof (30) as referred to above.

With a top still (45) temperature of 146° C. there are taken as overhead 1,747 kg./hr. of hydrogen chloride and 1,193 kg./hr. of water vapor. The still overhead is passed into a condenser (49) wherein it is cooled to 40° C., resulting in the condensation of 1,080 kg./hr. of HCl and 1,188 kg./hr. of $H_2O$ as hydrochloric acid which is returned (50) to the still as reflux. The uncondensed gas consisting of 667 kg./hr. of HCl and 5 kg./hr. of $H_2O$ is withdrawn from the condenser (49) and recycled (12) to the reaction zone.

The gaseous overhead leaves (32) the axtraction column (25) at the rate of 5,644 kg./hr., at a temperature of 90.5° C., a pressure of 1.5 atm. abs., and has the following composition in parts by weight:

| | |
|---|---:|
| $H_2O$ | 1,591 |
| $C_2Cl_6$ | 47 |
| $O_2$ | 110 |
| $N_2$ | 1,952 |
| $CO_2$ | 35 |
| $Cl_2$ | 1,900 |
| $CCl_4$ | 9 |
| | 5,644 |

The gaseous overhead leaves (32) the extraction column (25) is cooled to a temperature of 71.5° C. in a cooler (33) thereby condensing 1,075 kg./hr. of water from the gas. The water so condensed is passed (36) from the cooler (33) through a heat exchanger (38) wherein it is heated to 90° C., into the top (31) of the extraction column (25) to be used therein as the aqueous scrubbing agent in the top water scrubbing section (26) referred to above.

The cooled gaseous stream, now free of a substantial part of its water content leaves (70) the cooler (33) at a temperature of 71.5° C., a pressure of 1.5 atm. abs. and has the composition in parts by weight:

| | |
|---|---:|
| $H_2O$ | 516 |
| $C_2Cl_6$ | 47 |
| $O_2$ | 110 |
| $N_2$ | 1,952 |
| $CO_2$ | 35 |
| $Cl_2$ | 1,900 |
| $CCl_4$ | 9 |
| | 4,569 |

It will be seen that the gaseous stream leaving (70) the cooler (33) receiving the extraction column (25) overhead, combined with the gaseous stream recycled (12) from the still-overhead condenser (49), equals the composition and weight of the gaseous mixture charged (17) to the quenching chamber (20). Complete recovery of the hydrogen chloride component of the charge to the recovery system, free of any substantial amount of water, is thus attained.

The chlorine-containing gaseous stream leaving (70) the cooler (33) receiving the extraction column overhead is scrubbed with 9,333 kg./hr. of water in a cooler-scrubber (72). The scrubbing water is introduced into the cooler-scrubber (72) through a plurality of staged distributors at temperatures of 10° to 15° C. to remove water vapor and impurities including $C_2Cl_6$ by condensation. The overhead from the cooler-scrubber (72) has the composition:

| | |
|---|---:|
| $H_2O$ | 21 |
| $C_2Cl_6$ | 4 |
| $N_2$ | 1,952 |
| $O_2$ | 110 |
| $CO_2$ | 35 |
| $Cl_2$ | 1,891 |
| $CCl_4$ | 9 |
| | 4,022 |

Liquid bottoms (GH) are continuously withdrawn (80) from the cooler-scrubber (72) at the rate of 10,428 kg./hr. of water containing 43 kg./hr. of $C_2Cl_6$ and 9 kg./hr. of chlorine and eliminated from the system.

I claim as my invention:

1. The process for recovering hydrogen chloride, free of any substantial amount of water, and chlorine from a hot gaseous reaction mixture containing hydrogen chloride in admixture with water vapor and chlorine, by the combination of steps consisting essentially of: quenching said hot gaseous mixture to a temperature of from about 40° to about 150° C. with a member of the group consisting of water and hydrochloric acid, in a quenching zone, subjecting the resulting quenched mixture to countercurrent contact in an extrusion zone with liquid solvent emanating thereto as two separate streams from within the system as described below, thereby separating a vapor overhead fraction comprising water vapor and chlorine from a liquid bottom fraction comprising concentrated hydrochloric acid in said extraction zone, passing said overhead vapor fraction from said extraction zone into a cooling zone, cooling said overhead vapor fraction in said cooling zone, thereby separating a liquid fraction consisting essentially of water from a gaseous fraction comprising chlorine and water vapor in said cooling zone, separating chlorine from said gaseous fraction separated in said cooling zone, passing said liquid fraction from said cooling zone into said extraction zone at a point near the withdrawal of said vapor overhead fraction therefrom to be used therein as the first of said two streams of solvent emanating thereto from within the system, passing said liquid bottom fraction separated in said extraction zone into a distillation zone, distilling hydrogen chloride free of any substantial amount of water from liquid bottoms consisting essentially of dilute hydrochloric acid in said distillation zone, passing said liquid bottoms from said distillation zone into said extraction zone at an intermediate point thereof to be used therein as the second of said two liquid solvent streams emanating thereto from within the system, and controlling the degree of cooling and consequent water vapor condensation effected in said cooling zone to maintain the quantity of water retained in said gaseous fraction separated in said cooling zone plus any quantity of water eliminated in the uncondensed overhead from said distillation zone substantially equal to the total quantity of water entering said quenching zone from a source outside the recovery system.

2. The process for recovering hydrogen chloride, free of any substantial amount of water, and chlorine from a hot gaseous reaction mixture containing hydrogen chloride in admixture with water vapor and chlorine by the combination of steps consisting essentially of: quenching said hot gaseous mixture to a temperature of from about 40° to about 150° C. in a quenching zone with hydrochloric acid emanating from within the system, subjecting the resulting quenched mixture to countercurrent contact in an extraction zone with liquid solvent emanating thereto as two separate streams from within the system as described below, thereby separating a vapor overhead fraction comprising water vapor and chlorine from a liquid bottom fraction comprising concentrated hydrochloric acid in said extraction zone, passing said overhead vapor fraction from said extraction zone into a cooling zone, cooling said overhead vapor fraction in said cooling zone, thereby separating a liquid fraction consisting essentially of water from a gaseous fraction comprising chlorine and water vapor in said cooling zone, separating chlorine from said gaseous fraction separated in said cooling zone, passing said liquid fraction from said cooling zone into said extraction zone at a point near the withdrawal of said vapor overhead fraction therefrom to be used therein as the first of said two streams of solvent emanating thereto from within the system, passing a part of said liquid bottom fraction separated in said extraction zone into said quenching zone to be used therein as said hydrochloric acid emanating thereto from within the system, passing the remainder of said liquid bottom fraction separated in said extraction zone into a distillation zone, distilling hydrogen chloride free of any substantial amount of water from liquid bottoms consisting essentially of dilute hydrochloric acid approximating the composition of hydrogen chloride-water azetrope in said distillation zone, passing liquid bottoms from said distillation zone into said extraction zone at an intermediate point thereof to be used therein as the second of said two solvent streams emanating thereto from within the system, and controlling the degree of cooling and consequent water vapor condensation effected in said cooling zone to maintain the quantity of water retained in said gaseous fraction separated in said cooling zone plus any quantity of water eliminated with the uncondensed overhead from said distillation zone substantially equal to the quantity of water in said hot gaseous mixture introduced into said quenching zone.

3. The process in accordance with claim 2 wherein said liquid fraction passed from said cooling zone into said extraction zone, at a point near the withdrawal of said vapor overhead fraction therefrom, is preheated to the temperature prevailing in the upper part of said extraction zone before its introduction into said extraction zone.

References Cited by the Examiner

UNITED STATES PATENTS

| | | | |
|---|---|---|---|
| 1,906,467 | 5/1933 | Heath | 203—12 X |
| 2,909,240 | 10/1959 | Colton | 55—71 |
| 3,233,978 | 2/1966 | Alkemade | 55—71 X |

FOREIGN PATENTS

| | | |
|---|---|---|
| 229,889 | 10/1963 | Austria. |
| 1,040,338 | 5/1953 | France. |

NORMAN YUDKOFF, *Primary Examiner.*

J. B. DONIHEE, D. EDWARDS, *Assistant Examiners.*